US010962685B2

(12) United States Patent
Kihara et al.

(10) Patent No.: US 10,962,685 B2
(45) Date of Patent: Mar. 30, 2021

(54) PLASTIC OPTICAL FIBER, PLASTIC OPTICAL FIBER CABLE, WIRE HARNESS AND VEHICLE (71) Applicant: Mitsubishi Chemical Corporation, Tokyo (JP)

(72) Inventors: Hideki Kihara, Tokyo (JP); Noboru Fujikura, Tokyo (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 16/567,934

(22) Filed: Sep. 11, 2019

(65) Prior Publication Data
US 2020/0003932 A1 Jan. 2, 2020

Related U.S. Application Data (63) Continuation of application No. PCT/JP2018/009520, filed on Mar. 12, 2018.

(30) Foreign Application Priority Data

Mar. 13, 2017 (JP) .............................. JP2017-047360
Feb. 6, 2018 (JP) .............................. JP2018-019350

(51) Int. Cl.
G02B 1/04 (2006.01)
G02B 6/02 (2006.01)
(Continued)

(52) U.S. Cl.
CPC ............. G02B 1/046 (2013.01); G02B 1/048 (2013.01); G02B 6/02 (2013.01); G02B 6/036 (2013.01);
(Continued)

(58) Field of Classification Search
CPC .......... G02B 6/02; G02B 6/036; G02B 1/046; G02B 1/048
See application file for complete search history.

(56) References Cited

U.S. PATENT DOCUMENTS 5,444,809 A * 8/1995 Aoki ..................... C09K 21/12
252/609
7,609,930 B2 * 10/2009 Aoyagi .............. G02B 6/02033
385/128
(Continued)

FOREIGN PATENT DOCUMENTS

JP 2002-040267 A 2/2002
JP 2003-014952 A 1/2003
(Continued)

OTHER PUBLICATIONS

International Search Report issued in related International Patent Application No. PCT/JP2018/009520 dated May 15, 2018.
(Continued)

Primary Examiner — Daniel Petkovsek
(74) Attorney, Agent, or Firm — Morgan, Lewis & Bockius LLP (57) ABSTRACT There is provided a plastic optical fiber including a core and at least one layer of a clad formed on an outer circumferential surface of the core, wherein a transmission band is 100 MHz or wider, as measured under conditions of a wavelength of 650 nm and a launch NA=0.65; and a transmission loss is 350 dB/km or less, as measured under conditions of a wavelength of 650 nm and a launch NA=0.1, after exposure to an environment of a temperature of 105° C. for 1000 hours.

7 Claims, 1 Drawing Sheet (51) Int. Cl.
*G02B 6/036* (2006.01)
*C08L 27/16* (2006.01)
*C08L 27/18* (2006.01)
*C08L 27/20* (2006.01)
*C08L 33/10* (2006.01)
*C08L 33/16* (2006.01)
*C08L 77/06* (2006.01)
*G02B 6/44* (2006.01)

(52) U.S. Cl.
CPC ............. *C08L 27/16* (2013.01); *C08L 27/18* (2013.01); *C08L 27/20* (2013.01); *C08L 33/10* (2013.01); *C08L 33/16* (2013.01); *C08L 77/06* (2013.01); *G02B 6/44* (2013.01)

(56) References Cited

U.S. PATENT DOCUMENTS

| | | | |
|---|---|---|---|
| 2009/0067794 A1 | 3/2009 | Aoyagi et al. | |
| 2011/0176814 A1* | 7/2011 | Tsukamoto | G02B 1/048 398/182 |
| 2012/0177329 A1* | 7/2012 | Sakabe | G02B 6/02033 385/100 |
| 2014/0329040 A1 | 11/2014 | Aten et al. | |
| 2016/0334548 A1 | 11/2016 | Kihara et al. | |
| 2017/0322372 A1* | 11/2017 | Kihara | G02B 6/4433 |

FOREIGN PATENT DOCUMENTS

| | | |
|---|---|---|
| JP | 2003-084148 A | 3/2003 |
| JP | 2003-139973 A | 5/2003 |
| JP | 2005-164715 A | 6/2005 |
| JP | 2007-052095 A | 3/2007 |
| WO | 01/48538 A1 | 7/2001 |
| WO | 2008/038791 A1 | 4/2008 |
| WO | 2015/111506 A1 | 7/2015 |
| WO | 2015/153701 A1 | 10/2015 |

OTHER PUBLICATIONS

Partial Supplementary European Search Report issued in counterpart European Patent Application No. 18766728.2 dated Dec. 4, 2020.

* cited by examiner

PLASTIC OPTICAL FIBER, PLASTIC OPTICAL FIBER CABLE, WIRE HARNESS AND VEHICLE

TECHNICAL FIELD

The present invention relates to a plastic optical fiber, a plastic optical fiber cable, a wire harness and a vehicle.

BACKGROUND ART

Optical fibers are used in a wide range of applications, such as communication, sensors, lighting, decoration and displays. Glass-based optical fibers are excellent in light transmission property over a wide wavelength, but have problems to be inferior in workability and mechanical characteristics. On the other hand, examples of plastic optical fibers include a plastic optical fiber having a structure in which an outer circumference of a core that is formed from a resin having a high transparency such as polymethyl methacrylate is covered with a resin having high transparency and a lower refractive index than the core, and have features to be excellent in workability and flexibility, as compared to the glass-based optical fibers.

In addition, the plastic optical fibers have recently increased a transmission distance with an improvement of a manufacturing technology, and are expanding the applications such as optical information communication in trains, aircrafts and vehicles such as automobiles, and optical information communication in a field of factory automation (FA).

The plastic optical fibers, when being used in the vehicles such as the automobiles or for the optical information communication in the FA field, are usually used in an environment close to a high-temperature body such as an engine or used in a high-temperature environment in summer, and accordingly, it is desired that the plastic optical fibers are excellent in long-term heat resistance so that a transmission loss does not increase even when having been exposed to heat for a long period of time.

In recent years, the plastic optical fibers are being combined with a visible red-light source that can be driven at high speed, and are being used as a signal transmission line for a high-speed LAN, and the plastic optical fibers are desired to be excellent in band characteristics.

In addition, the plastic optical fibers, when being used as wiring in a vehicle such as an automobile, are usually used in a state of being laid in a state of being bent in a narrow space. In this case, it is desired for the plastic optical fiber that a loss of a quantity of light is small even if the plastic optical fiber has been bent (low bending loss) at a radius of 10 mm, in other words, a flexibility is desired.

Furthermore, it is desired for the plastic optical fiber that even when being used in a vehicle such as an automobile, in a state of having received a mechanical action such as vibration, or being used in a factory automation (FA) field while a state in which the fiber is bent and a state in which the fiber is kept linearly are repeated, the plastic optical fiber does not cause a crack in the core or the clad of itself, or delamination between the core and the clad, or delamination between dads in the case of dads formed of two or more layers, and does not increase the transmission loss. In other words, a plastic optical fiber excellent in mechanical durability is desired.

As a method for improving a transmission band of the plastic optical fiber, an optical fiber is disclosed in which a material for the clad is optimized, in Patent Literatures 1 and 4, for example. In addition, in Patent Literature 2 (for example, Example 9), an optical fiber is disclosed in which a material for a first clad in dads of a two-layer structure is optimized, as a method of improving heat resistance (glass transition temperature) and the like. As a method of improving the long-term heat resistance and flexibility of the plastic optical fiber, an optical fiber is disclosed in which a material for the second clad is optimized, in Patent Literature 3, for example.

CITATION LIST

Patent Literature

Patent Literature 1: WO 01/48538
Patent Literature 2: WO 2015/111506
Patent Literature 3: JP2003-139973A
Patent Literature 4: JP2003-14952A

SUMMARY OF INVENTION

Technical Problem

However, the plastic optical fiber disclosed in Patent Literature 1 is not sufficient in the long-term heat resistance, the flexibility and the mechanical durability. In addition, the plastic optical fiber disclosed in Example 9 of Patent Literature 2 is not sufficient in the long-term heat resistance. In addition, the plastic optical fiber disclosed in Patent Literature 3 is narrow in the transmission band. It is tried to attenuate a high-order mode and widen the transmission band in a conventional cladding structure, and the band becomes wide for incident light at a low launch NA, but the band has been narrow for incident light at a high launch NA. The plastic optical fiber disclosed in Patent Literature 4 is not sufficient in the mechanical durability.

Thus, an object of the present invention is to provide a plastic optical fiber which has the wide transmission band and is excellent in the long-term heat resistance, the flexibility and the mechanical durability.

Solution to Problem

According to a first aspect of the present invention, there is provided a plastic optical fiber having one core and at least one layer of a clad formed on an outer circumferential surface of the core, wherein a transmission band is 100 MHz or wider, as measured under conditions of a wavelength of 650 nm and a launch NA=0.65; and a transmission loss is 350 dB/km or less, as measured under conditions of a wavelength of 650 nm and a launch NA=0.1, after exposure to an environment of a temperature of 105° C. for 1000 hours.

According to a second aspect of the present invention, there is provided a plastic optical fiber having a core formed of a homopolymer of methyl methacrylate or a copolymer of methyl methacrylate and one or more vinyl-based monomers, and dads of a first clad and a second clad formed in this order concentrically on an outer circumferential surface of the core, wherein a material for the first clad includes a copolymer containing 0 to 70% by mass of a repeating unit derived from at least one fluoroalkyl (meth)acrylate represented by the following Formula (1) or the following Formula (2) (where Formula (1) excludes 2-(perfluorohexyl) ethyl methacrylate), and 7 to 55% by mass of a repeating unit derived from 2-(perfluorohexyl)ethyl methacrylate, based on the total mass of the materials for the first clad, and a refractive index of the material for the first clad is 1.430 to 1.485:

[Formula 1]

$$CH_2=CR \\ | \\ COO-(CH_2)_m(CF_2)_nX \quad (1)$$

wherein R is a hydrogen atom or a methyl group, X is a hydrogen atom or a fluorine atom, m is 1 or 2, and n is an integer of 5 to 13, and

[Formula 2]

$$CH_2=CR \\ | \\ COO-(CH_2)_m(CF_2)_nX \quad (2)$$

wherein R is a hydrogen atom or a methyl group, X is a hydrogen atom or a fluorine atom, m is 1 or 2, and n is an integer of 1 to 4; and a material for the second clad includes a fluorine-containing olefin-based polymer which contains a tetrafluoroethylene unit and has a heat of crystal melting of 40 mJ/mg or smaller in differential scanning calorimetry (DSC).

According to another aspect of the present invention, there is provided a plastic optical fiber cable having the plastic optical fiber and a covering layer provided on the outer circumference thereof.

According to another aspect of the present invention, there is provided a wire harness containing the plastic optical fiber cable.

According to another aspect of the present invention, there is provided a vehicle containing the plastic optical fiber.

According to another aspect of the present invention, there is provided a vehicle containing the plastic optical fiber cable.

According to another aspect of the present invention, there is provided a vehicle containing the wire harness.

Advantageous Effect of Invention

According to the embodiment of the present invention, there can be provided a plastic optical fiber that has a wide transmission band and is excellent in long-term heat resistance, flexibility and mechanical durability.

DESCRIPTION OF EMBODIMENTS

In a plastic optical fiber of the present invention (hereinafter appropriately abbreviated as "optical fiber"), a transmission band is 100 MHz or wider, as measured under conditions of a wavelength of 650 nm and a launch NA=0.65; and also, a transmission loss is 350 dB/km or less, as measured under conditions of a wavelength of 650 nm and a launch NA=0.1, after exposure to an environment of a temperature of 105° C. for 1000 hours.

One aspect of the plastic optical fiber of the present invention is an optical fiber having a core and at least one layer of a clad formed on an outer circumferential surface of the core. It is preferable that the optical fiber of the present invention has a core and at least two layers of dads of a first clad and a second clad laminated in this order concentrically on the outer circumference of the core.

The mode of the optical fiber of the present invention is not limited, and examples thereof include a known step-index type optical fiber and a known multistep-index type optical fiber. Among these types of optical fibers, the step-index type optical fiber is preferable, because of being excellent in a balance among a transmission band, long-term heat resistance, flexibility and mechanical durability, receiving a large amount of light therethrough, and enabling long-distance communication.

Figure 1:
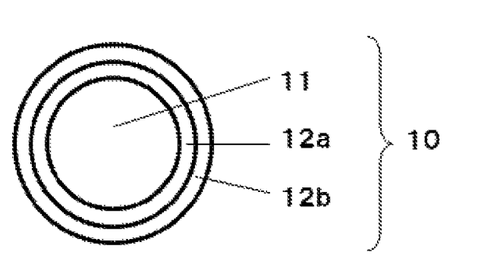
FIG. 1 is a schematic cross-sectional view showing one example of a plastic optical fiber according to an embodiment of the present invention.

FIG. 1 is a schematic cross-sectional view showing one example of the step-index type optical fiber according to an embodiment of the present invention. The optical fiber 10 shown in FIG. 1 is an optical fiber in which the dads are formed of two layers, the first clad 12a surrounds an outer circumference of the core 11, and the second clad 12b surrounds an outer circumference of the first clad 12a.

<Core>

A material (core material) which constitutes the core of the optical fiber of the present invention is not limited in particular, as long as the material is a resin having high transparency, and can be appropriately selected according to a purpose of use.

Examples of the resin having the high transparency include an acrylic resin, a styrene resin and a carbonate resin. These resins having the high transparency may each be used alone, or two or more types may be mixed and used. Among these polymers having the high transparency, the acrylic resin is preferable because of being capable of reducing the transmission loss of the optical fiber.

Examples of the acrylic resins include a homopolymer of methyl methacrylate (PMMA), and a copolymer of methyl methacrylate and one or more vinyl-based monomers. The above described copolymer specifically includes a copolymer containing 50% by mass or more of methyl methacrylate units. These acrylic resins may each be used alone, or two or more types may be mixed and used. Among these acrylic resins, the homopolymer of methyl methacrylate and the copolymer (methyl methacrylate-based copolymer) containing 50% by mass or more of the methyl methacrylate units are preferable, because of being excellent in optical characteristics, mechanical characteristics, heat resistance and the transparency. As the methyl methacrylate-based copolymer, a copolymer containing 60% by mass or more of the methyl methacrylate units is preferable, and a copolymer containing 70% by mass or more of the methyl methacrylate units is further preferable. The homopolymer of methyl methacrylate is particularly preferable as the core material.

In the present specification, the (meth)acrylate refers to an acrylate, a methacrylate, or both of them.

A refractive index of the core material such as the acrylic resin is preferably 1.485 to 1.50, and more preferably 1.490 to 1.495.

In the present specification, the refractive index shall be a value measured by a method which will be described later.

The core material can be produced by a known polymerization method. Examples of the polymerization method for producing the core material include a bulk polymerization method, a suspension polymerization method, an emulsion polymerization method and a solution polymerization method. Among these polymerization methods, the bulk polymerization method and the solution polymerization method are preferable, because of being capable of reducing a contamination by foreign substances.

<Clad>

A material (clad material) constituting the clad of the optical fiber of the present invention is a material of which the refractive index is lower than that of the core material.

It is preferable that the clad of the optical fiber of the present invention is at least two layers of dads of the first clad and the second clad laminated in this order concentrically on the outer circumference of the core.

<First Clad>

When the above resin having the high transparency (preferably, acrylic resin) is used as the core material, the material for the first clad (first clad material) preferably has a refractive index of 1.430 to 1.485, and more preferably has a refractive index of 1.440 to 1.480, and further preferably has a refractive index of 1.450 to 1.475, because of being capable of widening the transmission band of the optical fiber.

As a material for the first clad material, a fluorinated (meth)acrylate-based polymer can be used. Specifically, the above materials include fluorinated (meth)acrylate-based polymers such as a fluoroalkyl (meth)acrylate polymer, and a fluoroalkyl (meth)acrylate/alkyl (meth)acrylate copolymer.

The material for the first clad material is preferably a copolymer containing a repeating unit derived from 2-(perfluorohexyl)ethyl methacrylate (13FM) (hereinafter abbreviated as "13FM unit"), or a copolymer containing a repeating unit derived from the 13FM unit and at least one fluoroalkyl (meth)acrylate represented by the following Formula (1) or the following Formula (2) (where Formula (1) excludes 13FM), and is preferably a copolymer containing 0 to 70% by mass of a repeating unit derived from at least one fluoroalkyl (meth)acrylate (hereinafter abbreviated as "fluoroalkyl (meth)acrylate unit") represented by the following Formula (1) or the following Formula (2), and 7 to 55% by mass of a 13FM unit based on the total mass of the material, because an obtained optical fiber has a wide transmission band and is excellent in the long-term heat resistance, the flexibility and the mechanical durability.

[Formula 3]

(1)

wherein R is a hydrogen atom or a methyl group, X is a hydrogen atom or a fluorine atom, m is 1 or 2, and n is an integer of 5 to 13.

[Formula 4]

(2)

wherein R is a hydrogen atom or a methyl group, X is a hydrogen atom or a fluorine atom, m is 1 or 2, and n is an integer of 1 to 4.

In particular, it is preferable to use a copolymer containing the 13FM unit as the first clad material, because the optical fiber thereby enables the mechanical durability of the optical fiber to be adequate while maintaining the long-term heat resistance and transmission band of the optical fiber.

A lower limit of the content of the 13FM unit contained in the copolymer constituting the first clad material is preferably 7% by mass or more based on a total mass of the copolymer, from the viewpoint that the mechanical durability of the optical fiber becomes adequate, is more preferably 10% by mass or more, and is further preferably 15% by mass or more. On the other hand, an upper limit of the content of the 13FM unit is preferably 55% by mass or less based on the total mass of the copolymer, from the viewpoint that the long-term heat resistance of the optical fiber becomes adequate, is more preferably 45% by mass or less, and is further preferably 35% by mass or less.

In addition, it is preferable that the first clad material is a copolymer containing the above fluoroalkyl (meth)acrylate unit, because the first clad is excellent in the transparency, accordingly the optical fiber becomes suitable for the long-distance communication, and the flexibility and the transmission band thereof become adequate.

A lower limit of the content of the above fluoroalkyl (meth)acrylate unit contained in the copolymer constituting the first clad material is preferably 5% by mass or more based on a total mass of the copolymer, from the viewpoint that the flexibility of the optical fiber becomes adequate, is more preferably 8% by mass or more, and is further preferably 13% by mass or more. On the other hand, an upper limit of the content is preferably 70% by mass or less based on the total mass of the copolymer, from the viewpoint that the long-term heat resistance of the optical fiber becomes adequate, is more preferably 65% by mass or less, and is further preferably 60% by mass or less.

By the use of the fluoroalkyl (meth)acrylate represented by the above Formula (1), the flexibility of the optical fiber becomes adequate. Specifically, the above fluoroalkyl (meth)acrylates include long-chain fluoroalkyl (meth)acrylates such as 2-(perfluorooctyl) ethyl methacrylate (17FM) and 2-(perfluorodecyl) ethyl methacrylate (21FM).

By the use of the fluoroalkyl (meth)acrylate represented by the above Formula (2), the transmission band of the optical fiber becomes adequate. Specifically, the above fluoroalkyl (meth)acrylates include short chain fluoroalkyl (meth)acrylates such as 2,2,2-trifluoroethyl methacrylate (3FM), 2,2,3,3-tetrafluoropropyl methacrylate (4FM), 2,2,3,3,3-pentafluoropropyl methacrylate (5FM), and 1H,1H,5H-octafluoropentyl methacrylate (8FM).

The above copolymer constituting the first clad can contain a repeating unit derived from another copolymerizable monomer, as needed, in such a range as not to impair the performance of the optical fiber of the present invention.

The above another copolymerizable monomer is not limited in particular as long as the monomer is copolymerizable with 13 FM and the fluoroalkyl (meth)acrylate represented by the above Formula (1) or the above Formula (2), and examples thereof include known alkyl (meth)acrylates such as methyl (meth)acrylate, ethyl (meth)acrylate and butyl (meth)acrylate, and units of compounds such as methacrylic acid. In particular, methyl methacrylate improves the transparency of the clad, and accordingly a loss of a quantity of light in the optical fiber decreases, which is suitable for long distance communication.

If the material for the first clad material is a copolymer formed of 0 to 70% by mass of the above fluoroalkyl (meth)acrylate unit, 7 to 55% by mass of a 13 FM unit, and 23 to 88% by mass of a repeating unit derived from the above another copolymerizable monomers, based on the total mass of the material, the optical fiber is excellent in the long-term heat resistance and the mechanical durability, which is accordingly preferable.

Specifically, a 13FM/17FM/methyl methacrylate (MMA)/methacrylic acid (MAA) copolymer, a 13FM/21FM/MMA/MAA copolymer and a 13FM/MMA/MAA copolymer are preferable which have each the above composition. Among the copolymers, the 13FM/MMA/MAA copolymer is preferable because of being capable of making the mechanical durability of the optical fiber more excellent.

<Second Clad>

When the above resin having the high transparency (preferably, acrylic resin) is used as the core material and when the above material is used preferably as the first clad material, a fluorine-containing olefin-based polymer can be used as the second clad material.

As the fluorine-containing olefin-based polymer, specifically, a fluorine-containing olefin-based polymer can be used which contains a tetrafluoroethylene unit and has a heat of crystal melting of 40 mJ/mg or smaller in differential scanning calorimetry (DSC), because the optical fiber becomes excellent in the long-term heat resistance, the flexibility and the mechanical durability. By containing the tetrafluoroethylene units, the optical fiber acquires adequate mechanical durability. If the heat of crystal melting in DSC is 40 mJ/mg or smaller, the long-term heat resistance of the optical fiber becomes adequate.

The second clad material is preferably a material of which the refractive index is 1.340 to 1.395, is more preferably a material of which the refractive index is 1.350 to 1.390, and is further preferably a material of which the refractive index is 1.360 to 1.390.

Specifically, fluorine-containing olefin-based polymers are preferable such as a vinylidene fluoride (VDF)/tetrafluoroethylene (TFE)/hexafluoropropylene (HFP) copolymer, a VDF/HFP copolymer, and an ethylene/TFE/HFP copolymer.

The above VDF/TFE/HFP copolymer specifically contains a polymer containing 25.01 to 92% by mole of VDF units, 0.01 to 54% by mole of TFE units, and 3.0 to 20.99% by mole of HFP units. A polymer containing 37.01 to 92% by mole of VDF units, 0.01 to 54% by mole of TFE units and 4.0 to 7.99% by mole of HFP units gives more adequate long-term heat resistance and mechanical durability to the optical fiber, which is accordingly preferable.

When three or more layers of the clad materials are laminated, the material for each layer is not limited in particular as long as the refractive index of each of the layers is lower than the refractive index of the inner layer which comes in contact with the layer, but the above fluorinated (meth)acrylate-based polymer is preferable, because of being capable of widening the transmission band of the optical fiber.

<Production of Optical Fiber>

The optical fiber can be produced with the use of a known production method, for example, by a melt spinning method.

The optical fiber can be produced by the melt spinning method, for example, by steps of separately melting the core material and the clad material, and subjecting the resultant materials to conjugate spinning.

<Optical Fiber>

One aspect of the optical fiber of the present invention includes an optical fiber satisfying the following Expressions (i) and (ii), when the outer diameter of the optical fiber is represented by A (μm) and the thickness of the above first clad is represented by a (μm).

$$900 \leq A \leq 1100 \quad (i)$$

$$3.0 \leq a \leq 35 \quad (ii)$$

When the optical fiber satisfies the expression (i), the handleability of the optical fiber becomes adequate and the laying becomes easy. Furthermore, in the case where the optical fiber satisfies the expression (ii), the optical fiber is suitable for in-vehicle wiring of an automobile and the like, because of being excellent in the balance among the transmission band, the long-term heat resistance, the flexibility and the mechanical durability.

In the optical fiber of the present invention, the transmission band is 100 MHz or wider, as measured under conditions of a wavelength of 650 nm and a launch NA=0.65; and a transmission loss is 350 dB/km or less, as measured at a wavelength of 650 nm and a launch NA=0.1, after exposure to an environment of a temperature of 105° C. for 1000 hours.

When the fiber is sharply bent and wired, light incident on the optical fiber at a low incidence NA propagates in the optical fiber as light of a low-order mode while repeating total reflection, and meanwhile, a reflection angle of light is disordered at the bent portion; light converted into a high-order mode increases, and the transmission band is reduced; and accordingly the reliability of high-speed communication tends to be impaired. However, when the transmission band measured under the conditions of the wavelength of 650 nm and the launch NA=0.65 is 100 MHz or wider, as in the optical fiber of the present invention, the transmission band of the optical fiber can be sufficiently widely maintained even when the fiber is sharply bent and wired; and accordingly can be used as a signal transmission line for high-speed LAN, which is accordingly preferable. The transmission band is more preferably 150 MHz or wider, is further preferably 175 MMHz or wider, and is particularly preferably 220 MHz or wider, as measured under the conditions of the wavelength of 650 nm and the launch NA=0.65.

Furthermore, as for the optical fiber according to the present invention, when the transmission band is 150 MHz or wider, as measured under the conditions of the wavelength of 650 nm and the launch NA=0.2, the transmission band of the optical fiber at the time when the LED element is used as a light source is sufficiently wide, and can be used as a signal transmission line for high-speed LAN, which is accordingly preferable. The transmission band is more preferably 200 MHz or wider, is further preferably 230 MHz or wider, and is particularly preferably 260 MHz or wider, as measured under the conditions of the wavelength of 650 nm and the launch NA=0.2.

As means for controlling the transmission band to 100 MHz or wider, as measured under the conditions of the wavelength of 650 nm and the launch NA=0.65, there is means of using, for example, at least two layers for the clad layers, controlling a refractive index of the first clad material to a range of 1.430 to 1.485, and using a copolymer for the first clad material, which contains 0 to 70% by mass of fluoroalkyl (meth)acrylate units and 7 to 55% by mass of 13 FM units based on the total mass of the first clad material; and thereby the transmission band can be controlled to 100 MHz or wider, as measured under the conditions of the wavelength of 650 nm and the launch NA=0.65. Furthermore, it is preferable to control the refractive index of the material for the second clad to a range of 1.340 to 1.395.

It is preferable that the transmission loss is 350 dB/km or less, as measured under the conditions of the wavelength of 650 nm and the launch NA=0.1 after the exposure to an environment of a temperature of 105° C. for 1000 hours, because the optical fiber can be used under a high temperature environment, is more preferable that the transmission loss is 300 dB/km or less, and is further preferable that the transmission loss is 280 dB/km or less.

The transmission loss of the optical fiber can be controlled to 350 dB/km or less, as measured under the conditions of the wavelength of 650 nm and a launch NA=0.1 after the exposure to the environment of the temperature of 105° C. for 1000 hours, for example, by using at least two layers for the clad layers and using a fluorine-containing olefin-based polymer for the second clad material, which contains a tetrafluoroethylene unit and has a heat of crystal melting of 40 mJ/mg or smaller in differential scanning calorimetry (DSC).

In the present specification, the transmission loss and the transmission band shall be values obtained by measurement according to a method which will be described later.

In the optical fiber according to the present invention, it is preferable that a difference (loss due to stationary bending) between a quantity of light, as measured at a wavelength of 650 nm and overfilled launch in a state in which an optical fiber is linearly held, and a quantity of light, as measured in a state in which the optical fiber is bent at a bending radius of 10 mm and a bending angle of 90°, is 1 dB or smaller, is more preferable that the difference is 0.7 dB or smaller, and is further preferable that the difference is 0.5 dB or smaller. When the difference between the quantities of light is 1 dB or smaller, the optical fiber is excellent in the flexibility, and accordingly can be laid in a narrow space in a bent state, when being used as wiring in a vehicle such as an automobile.

By using at least two layers for the clad layers and controlling the refractive index of the second clad material to a range of 1.340 to 1.395, the above loss due to the stationary bending can be decreased to 1 dB or smaller. Furthermore, it is more preferable to control the refractive index of the first clad material to a range of 1.430 to 1.485.

In addition, in the present specification, the loss due to the stationary bending shall be a value measured by a method which will be described later.

In the optical fiber of the present invention, it is preferable that a number of times of repetitive bending, as measured by a repetitive bending test according to IEC 60794-1-21: 2015, is 14500 or more, is more preferable that the number is 17000 or more, and is further preferable that the number is 20000 or more. When the number of times of repetitive bending is 14500 or more, the optical fiber is excellent in mechanical durability, and accordingly can be used in an environment in which the optical fiber is used while a bent state and a linearly held state are repeated in a factory automation (FA) field and an environment in which the optical fiber receives a mechanical action such as vibration in a vehicle such as an automobile.

By using at least two layers for the clad layers and using a copolymer for the first clad material, which contains 0 to 70% by mass of the above fluoroalkyl (meth) acrylate units and 7 to 55% by mass of 13 FM units based on the total mass of the first clad material, the above number of times of repetitive bending can be controlled to 14500 times or more.

In particular, it is preferable to use a copolymer containing 13 FM units as the first clad material, because the optical fiber can thereby improve the mechanical durability while maintaining the long-term heat resistance and transmission band of the optical fiber.

In addition, in the present specification, the number of times of repetitive bending shall be a value measured by a method which will be described later.

<Sizes of Optical Fiber, Core and Clad>

The diameter of the optical fiber is preferably 0.1 mm to 5 mm, is more preferably 0.2 mm to 3 mm, is further preferably 0.3 to 2 mm, and is particularly preferably 0.9 to 1.1 mm, from the viewpoints of excellence in handleability, binding efficiency with an optical element, and allowance to the deviation of an optical axis, of the optical fiber.

The diameter of the core based on the diameter of the optical fiber is preferably 85% or more based on the diameter of the optical fiber, and is more preferably 90% or more, from the viewpoints of the binding efficiency with the optical element and the allowance to the deviation of the optical axis. From the viewpoint of the allowance to unevenness of the thickness of the clad, it is preferable to control the diameter of the core to 99.9% or smaller based on the diameter of the optical fiber.

Thickness of the first clad is preferably 15% or smaller based on the diameter of the optical fiber, is more preferably 10% or smaller, and is further preferably 7% or smaller, from the viewpoints of excellence in the transmission band, the binding efficiency with the optical element, and the allowance to the deviation of the optical axis. It is preferable to control the thickness of the first clad to 0.05% or larger based on the diameter of the optical fiber. For example, when the diameter of the fiber is 1.0 mm, the thickness of the first clad is preferably 0.5 to 150 µm, is more preferably 1.0 to 100 µm, is further preferably 2.0 to 50 µm, and is particularly preferably 3.0 to 35 µm.

It is preferable to control the thickness of the second clad in the following way, from the viewpoints of excellence in the heat resistance, the flexibility, impact resistance and chemical resistance, the binding efficiency with the optical element, and the allowance to the deviation of the optical axis, of the optical fiber. Specifically, in the case of an n-layer structure in which the innermost layer of the clad is regarded as the first layer, a ratio of the thickness of the (n−1)-th layer to the thickness of the n-th layer, which is (n−1):n, is preferably 1:0.1 to 1:5, is more preferably 1:0.1 to 1:4, is further preferably 1:0.1 to 1:3, and is particularly preferably 1:0.2 to 1:3. For example, the above ratio between the thicknesses corresponds a ratio of the thickness of the first layer (innermost layer) to the thickness of the second layer (the outermost layer) when the clad is a two-layer structure, and corresponds to a ratio of the thickness of the second layer to the third layer (outermost layer) when the clad is a three-layer structure. It is preferable to control the thickness of each layer of the second and higher clad layers to 2 to 20 µm. Thus, the clad can be formed into a laminated structure in which the above ratio between the thicknesses and the thickness of each layer are appropriately set. In order to widen the transmission band of and give excellent heat resistance to the optical fiber, independently of the thickness of the first clad, it is preferable to use the above clad structure.

(Post Treatment)

In order to improve the mechanical characteristics of the optical fiber, it is preferable to subject the optical fiber to heating and drawing treatment. The heating and drawing treatment may be continuous or batch, and the treatment condition thereof may be appropriately set according to the material of the optical fiber.

When the optical fiber is used in an environment in which a temperature difference is large, it is preferable to subject the optical fiber to annealing treatment so as to suppress positioning. The annealing treatment may be continuous or batch, and the treatment condition thereof may be appropriately set according to the material of the optical fiber.

<Optical Fiber Cable>

The optical fiber according to the present invention can have a covering layer provided on the outer circumference of the above optical fiber to become a form of an optical fiber cable, as needed, and thereby when the optical fiber is used for wiring in a building and the connection between devices of an automobile, the covering layer can mechanically protect the optical fiber, and can protect the optical fiber from splashes of liquids such as gasoline, a battery liquid and a window washing liquid.

Examples of a material which constitutes the covering layer include olefin resins such as a polyethylene resin and a polypropylene resin; chlorinated resins such as a vinyl chloride resin and a chlorinated polyethylene resin; a fluorine resin; a urethane resin; a styrene resin; and a polyamide resin. These materials which constitute the covering layer may each be used alone, or two or more types may be concomitantly used. Among these materials for the covering layer, the olefin resin, the chlorinated resin, the fluorine resin, the urethane resin, the styrene resin and the polyamide resin are preferable, and the polyamide resin is more preferable, because of being excellent in the mechanical characteristics.

The covering layer may be a single layer or two or more layers.

<Method for Manufacturing Optical Fiber Cable>

An example of a method of covering the outer circumference of the optical fiber with the covering layer includes a method of covering the outer circumference with the use of an extrusion covering apparatus equipped with a crosshead die. In particular, in the case of covering a plastic optical fiber with a covering layer, a method of covering the plastic optical fiber with the use of an extrusion covering apparatus equipped with a crosshead die is preferable because an optical fiber cable with a uniform diameter can be obtained.

The covering layer may cover the fiber layer by layer sequentially, or multiple covering layers may simultaneously cover the fiber.

<Wire Harness>

The optical fiber cable of the present invention may be formed into a form of a wire harness in which the above optical fiber cable and an electric wire are bundled with the use of a known method such as a press-wrapping tape and a band, as needed, and can be used for connection between devices of an automobile, wiring in a building, and the like. By the form of the wire harness being adopted, the workability is improved at the time when the optical fiber cable and the electric wire are arranged in the automobile, the building and the like.

<Use>

The optical fiber, the optical fiber cable and the wire harness according to the present invention have a wide transmission band and are excellent in the long-term heat resistance, the flexibility and the mechanical durability, and accordingly can be suitably used, for example, for optical information communication in a train, an aircraft, the vehicle such as the automobile, and the building, and for the optical information communication in the factory automation (FA) field. The above products are particularly suitable for use in a state in which the products are exposed to a mechanical stress and a high temperature environment in a state of having been bent in a narrow space such as in the vehicle such as the automobile.

<Vehicle>

A vehicle containing the above optical fiber cable or the above wire harness contains the optical fiber of the present invention, and accordingly enables an introduction of: a safety control system such as an automatic brake system and a camera network; an external communication system of vehicle such as inter-vehicle communication, traffic information and GPS communication; and a next-generation communication system such as driving assistance and autonomous driving.

EXAMPLES

The present invention will be specifically described below with reference to Examples, but the present invention is not limited to these Examples.

(Measurement of Refractive Index)

Film-shaped test pieces with a thickness of 200 μm, with the use of various materials, were prepared by melt pressing, and the refractive indices of the various materials were measured with the use of an Abbe refractometer (model name "NAR-3T", manufactured by Atago Co., Ltd.) at 25° C. by sodium D line.

(Measurement of Transmission Band)

The outer circumference of the optical fiber obtained as described later was covered with a covering layer (polyethylene resin containing black pigment) having a thickness of 0.6 mm with the use of a crosshead type of 40 mm cable covering apparatus for resin covering (manufactured by Hijiri Manufacturing Ltd.), and an optical fiber cable having a diameter of 2.2 mm was obtained.

The band measurement with the use of the obtained optical fiber cable of 50 m will be described below.

Transmission and reception signals were compared under each of the conditions of a launch NA=0.65 and a launch NA=0.20, with the use of a signal transmission device equipped with a red LD (trade name "LL650-GI", manufactured by Graviton Inc., peak wavelength of approximately 658 nm) as a light-emitting element, and with an O/E converter (trade name "detector 1", Hamamatsu Photonics K.K., and bandwidth of 300 MHz or wider) as a light-receiving device, and a spectrum analyzer (signal transceiver integrated with tracking generator, trade name "E4402B" manufactured by Agilent Technologies, Inc.); frequency characteristics were measured; and the transmission band was confirmed. A method of confirming the transmission band adhered to the "frequency sweep method" which is described on page 50 of New Energy and Industrial Technology Development Organization Research Contract Results Report FY 2000 New Industry Support Type International Standard Development Project "Standardization of Test Evaluation Method for Plastic Optical Fiber" (March, 2001, Publisher: Japanese Standards Association, and Japan Chemical Industry Association). Specifically, an optical fiber cable with a length of 50 m was prepared, and a −3 dB band (unit: MHz) at a wavelength of 650 nm, and at each of a launch NA=0.65 and a launch NA=0.20 was measured by a frequency sweep method with the use of a sampling oscilloscope.

The transmission band at a launch NA=0.65 was evaluated according to the following criteria.

S: transmission band is 220 MHz or wider,

AA: transmission band is 175 MHz or wider,

A: transmission band is 100 MHz or wider and narrower than 175 MHz, and

B: transmission band is narrower than 100 MHz.

The transmission band at the launch NA=0.2 was evaluated according to the following criteria.

S: transmission band is 260 MHz or wider,

AA: transmission band is 230 MHz or wider and narrower than 260 MHz,

A: transmission band is 150 MHz or wider and narrower than 230 MHz, and

B: transmission band is narrower than 150 MHz.

(Measurement of Long-Term Heat Resistance)

The optical fiber obtained by a method described later was exposed to an environment of a temperature of 105° C. for 1000 hours, and the long-term heat resistance was measured by a cutback method of 25 m-1 m under conditions of a wavelength of 650 nm and a launch NA=0.1.

The measurement by the cutback method of 25 m-1 m was performed according to IEC 60793-1-40: 2001. Specifically, an optical fiber of 25 m was set in the measurement device, and an output power P2 was measured; then the optical fiber was cut to a cutback length (1 m from incident end), and an output power P1 was measured; and the transmission loss (unit: dB/km) of light was calculated with the use of the following Expression (1). The above measurements were carried out in a light-shielded environment.

[Expression 1]
$$\text{Transmission loss (dB/km)} = \frac{10 \times \log(P_1 / P_2)}{0.025 - 0.001} \quad (1)$$

In addition, the transmission loss was evaluated by the following criteria for determination.

AA: transmission loss is less than 200 dB/km,

A: transmission loss is 200 dB/km or more and less than 350 dB/km, and

B: transmission loss is 350 dB/km or more.

(Measurement of Flexibility)

A loss due to stationary bending was measured by the following method, as an index of the flexibility of the optical fiber.

One end face of an optical fiber with a length of 2 m, which was obtained by a method described later, was connected with a light source (red LED (trade name "TOTX 170A"), and wavelength of 650 nm) for overfilled launch, and the other end face thereof was connected with a light power meter (trade name "AQ1135E", manufactured by Ando Electric Co., Ltd., and receiver sensitivity of −70 dBm); and the loss (unit: dB) due to the stationary bending was calculated from a difference between a quantity of light in a state in which the optical fiber was linearly held and a quantity of light in a state in which the optical fiber was bent at a bending radius of 10 mm and a bending angle of 90°. The above measurements were carried out in a light-shielded environment.

In addition, the flexibility was evaluated by the following criteria for determination.

A: loss due to stationary bending is 1.0 dB or less, and

B: loss due to stationary bending exceeds 1.0 dB.

(Measurement of Mechanical Durability)

As an index of mechanical durability of the optical fiber cable, the number of times of repetitive bending was measured by the following method.

The measurement of the repetitive bending was performed according to IEC 60794-1-21: 2015. Specifically, an optical fiber cable with a length of 4 m obtained by the above method was attached to a repetitive bending apparatus (optical fiber bending tester with thermostatic bath, manufactured by Yasuda Seiki Seisakusho, Ltd.), a load of 500 gf (4.9 N) was applied to one end, and the middle of this optical fiber cable was sandwiched between two circular tubes with a diameter of 15 mm. The other end of this optical fiber cable was moved to one circular tube side; the optical fiber cable was wound around the outer circumference of the circular tube so that the optical fiber cable was bent by 90 degrees, then was moved to the other circular tube side, and was wound around the outer circumference of the circular tube so that the optical fiber cable was bent by 90 degrees; thus the optical fiber cable was bent in total of 180 degrees; and the operation was repeated. The test was ended at the time when the transmission loss increased by 1 dB from the initial value, and the number of times of repetitive bending at the end point was checked.

Moreover, the mechanical durability was evaluated by the following criteria for determination.

S: number of times of repetitive bending is 20000 times or more,

AA: number of times of repetitive bending is 15000 times or more, and less than 20000 times, A: number of times of repetitive bending is 10000 times or more, and less than 15000 times, and B: number of times of repetitive bending is less than 10000 times.

(Material)

The following materials were used for the core material which constituted the core of the optical fiber, and the clad material which constituted the clad thereof.

Core material (A-1): acrylic resin (polymer containing 100% by mass of methyl methacrylate)

First clad material (B-1): fluorine resin (13FM/MMA/MAA copolymer, 13FM:MMA:MAA=25:73:2 (mass ratio), and refractive index of 1.465)

First clad material (B-2): fluorine resin (13FM/3FM/MMA/MAA copolymer, 13FM:3FM:MMA:MAA=39:41:18:2 (mass ratio), and refractive index of 1.417)

Second clad material (C-1): fluorine resin (VDF/TFE/HFP copolymer, VDF:TFE:HFP=48:43:9 (mass ratio), and refractive index of 1.374)

Second clad material (C-2): fluorine resin (VDF/TFE copolymer, VDF:TFE=80:20 (mass ratio), and refractive index of 1.402)

Example 1

The acrylic resin (A-1) was employed as the core material, the fluorine resin (B-1) was employed as the first clad material, and the fluorine resin (C-1) was employed as the second clad material; the acrylic resin (A-1), the fluorine resin (B-1) and the fluorine resin (C-1) which were melted were each supplied to a spinning head at 225° C., and were spun with the use of a three-layer concentric composite spinning nozzle; the resultant fiber was drawn to twice in an axial direction of the fiber in a hot air heating furnace at 140° C.; and an optical fiber was obtained of which the thickness of the first clad was 5 µm, of which the thickness of the second clad was 10 µm, and of which the diameter was 1 mm.

The evaluation results of the obtained optical fiber are shown in Table 2.

Examples 2 to 4

Optical fibers were obtained in the same operation as in Example 1, except that the thicknesses of the first clad were changed as shown in Table 1. The evaluation results of the obtained optical fibers are shown in Table 2.

Comparative Examples 1 and 2

Optical fibers were obtained in the same operation as in Example 1, except that the materials were changed as shown in Table 1. The evaluation results of the obtained optical fibers are shown in Table 2.

TABLE 1

| | Core | | First clad | | | Second clad | | | |
|---|---|---|---|---|---|---|---|---|---|
| | Type | Refractive index | Type | Refractive index | Thickness (µm) | Type | Refractive index | Heat of crystal melting (mJ/mg) | Thickness (µm) |
| Example 1 | (A-1) | 1.492 | (B-1) | 1.465 | 5 | (C-1) | 1.374 | 15 | 10 |
| Example 2 | (A-1) | 1.492 | (B-1) | 1.465 | 10 | (C-1) | 1.374 | 15 | 10 |
| Example 3 | (A-1) | 1.492 | (B-1) | 1.465 | 20 | (C-1) | 1.374 | 15 | 10 |
| Example 4 | (A-1) | 1.492 | (B-1) | 1.465 | 30 | (C-1) | 1.374 | 15 | 10 |
| Comparative example 1 | (A-1) | 1.492 | (B-1) | 1.465 | 30 | (C-2) | 1.402 | 60 | 10 |
| Comparative example 2 | (A-1) | 1.492 | (B-2) | 1.417 | 5 | (C-1) | 1.374 | 15 | 10 |

TABLE 2

| | Transmission band | | | | Transmission loss | | | Flexibility | | Mechanical durability | |
|---|---|---|---|---|---|---|---|---|---|---|---|
| | | | | | Initial stage (dB/km) | Long-term heat resistance (dB/km) | Evaluation | Loss due to stationary bending (dB) | Evaluation | Number of times of repetitive bending (Times) | Evaluation |
| | NA = 0.65 (MHz) | Evaluation | NA = 0.2 (MHz) | Evaluation | | | | | | | |
| Example 1 | 230 | S | 270 | S | 131 | 190 | AA | 0.2 | A | 25,000 | S |
| Example 2 | 180 | AA | 230 | AA | 133 | 181 | AA | 0.2 | A | 22,000 | S |
| Example 3 | 185 | AA | 235 | AA | 135 | 215 | A | 0.2 | A | 18,000 | AA |
| Example 4 | 255 | S | 285 | S | 132 | 271 | A | 0.2 | A | 15,000 | AA |
| Comparative Example 1 | 170 | A | 240 | AA | 133 | 372 | B | 1.3 | B | 10,000 | A |
| Comparative Example 2 | 60 | B | 110 | B | 133 | 165 | AA | 0.3 | A | 50,000 | S |

The optical fibers obtained in Examples had a wide transmission band, and were excellent in the long-term heat resistance, the flexibility and the mechanical durability.

On the other hand, the optical fiber obtained in Comparative Example 1 was inferior in the long-term heat resistance, the flexibility and the mechanical durability, compared to the optical fibers of Examples. In addition, the optical fiber obtained in Comparative Example 2 had a narrow transmission band.

REFERENCE SIGNS LIST

10 Plastic optical fiber
11 Core
12a First clad
12b Second clad

The invention claimed is:

1. A plastic optical fiber comprising:
a core comprising a homopolymer of methyl methacrylate or a copolymer of methyl methacrylate and one or more vinyl-based monomers; and clads of a first clad and a second clad formed in this order concentrically on an outer circumferential surface of the core, wherein
a material for the first clad comprises a copolymer comprising 0 to 70% by mass of a repeating unit derived from at least one fluoroalkyl (meth)acrylate represented by the following Formula (1) or the following Formula (2), where Formula (1) excludes 2-(perfluorohexyl)ethyl methacrylate, and 7 to 55% by mass of a repeating unit derived from 2-(perfluorohexyl)ethyl methacrylate, based on the total mass of the materials, and a refractive index of the material for the first clad is 1.430 to 1.485:

(1)

wherein R is a hydrogen atom or a methyl group, X is a hydrogen atom or a fluorine atom, m is 1 or 2, and n is an integer of 5 to 13;

(2)

wherein R is a hydrogen atom or a methyl group, X is a hydrogen atom or a fluorine atom, m is 1 or 2, and n is an integer of 1 to 4; and a material for the second clad comprises a fluorine-containing olefin-based polymer which contains a tetrafluoroethylene unit, has a heat of crystal melting of 40 mJ/mg or smaller in differential scanning calorimetry (DSC), and has a refractive index of 1.340 to 1.395.

2. The plastic optical fiber according to claim 1, wherein the material for the second clad comprises a polymer comprising:
25.01 to 92% by mole of a repeating unit derived from vinylidene fluoride;
0.01 to 54% by mole of a repeating unit derived from tetrafluoroethylene; and
3.0 to 20.99% by mole of a repeating unit derived from hexafluoropropylene.

3. The plastic optical fiber according to claim 1, wherein when an outer diameter of the plastic optical fiber is represented by A (µm) and a thickness of the first clad is represented by a (µm),
the diameter and the thickness satisfy the following formulae (i) and (ii):

$$900 \leq A \leq 1100 \qquad (i), \text{ and}$$

$$3.0 \leq a \leq 35 \qquad (ii).$$

4. The plastic optical fiber according to claim 1,
wherein a refractive index of the material for the second clad is 1.340 to 1.395,
wherein the material for the second clad comprises a polymer comprising:
25.01 to 92% by mole of a repeating unit derived from vinylidene fluoride;
0.01 to 54% by mole of a repeating unit derived from tetrafluoroethylene; and
3.0 to 20.99% by mole of a repeating unit derived from hexafluoropropylene, and
wherein, when an outer diameter of the plastic optical fiber is represented by A (µm) and a thickness of the first clad is represented by a (µm), the diameter and the thickness satisfy the following formulae (i) and (ii):

$$900 \leq A \leq 1100 \qquad (i), \text{ and}$$

$$3.0 \leq a \leq 35 \qquad (ii).$$

5. A plastic optical fiber cable comprising: the optical fiber according to claim 4, and a covering layer provided on an outer circumference of the optical fiber, wherein a material for the covering layer comprises a polyamide resin.

6. A wire harness comprising: the plastic optical fiber cable according to claim 5, and an electric wire bundled together with the plastic optical fiber cable.

7. A vehicle comprising the plastic optical fiber cable according to claim 5.

* * * * *